Jan. 1, 1924

B. PALLAVICINI

SHOCK DEADENING BALL OR ROLLER BEARING

Filed Sept. 2, 1921 2 Sheets-Sheet 1

1,479,313

INVENTOR
BELA PALLAVICINI
BY
ATTORNEYS

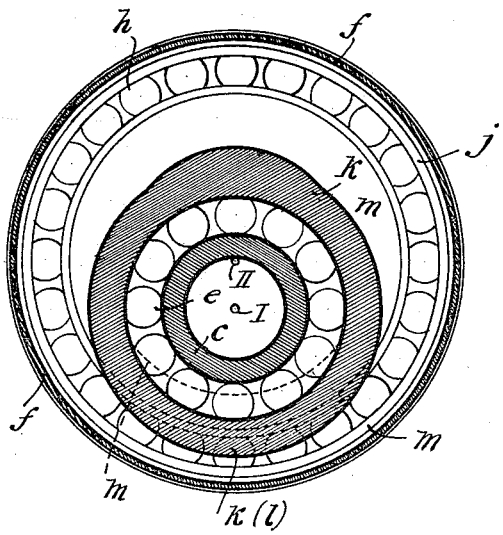
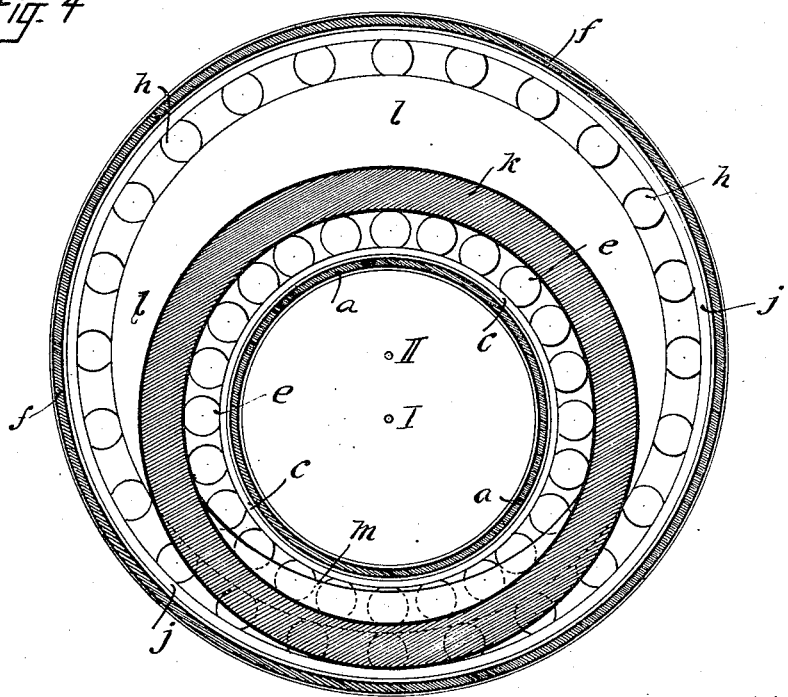

Patented Jan. 1, 1924.

1,479,313

UNITED STATES PATENT OFFICE.

BELA PALLAVICINI, OF VIENNA, AUSTRIA.

SHOCK-DEADENING BALL OR ROLLER BEARING.

Application filed September 2, 1921. Serial No. 497,964.

(GRANTED UNDER THE PROVISIONS OF THE ACT OF MARCH 3, 1921, 41 STAT. L., 1313.)

*To all whom it may concern:*

Be it known that I, BELA PALLAVICINI, an Austrian citizen, residing at Gusshaustrasse 17, Vienna 4, Austria, have invented certain new and useful Improvements in or Relating to Shock-Deadening Ball or Roller Bearings (for which I have filed applications in Austria, Dec. 18, 1919, Patent #88140, of March 15, 1921; Germany, Dec. 29, 1919, Patent #335,144, Dec. 30, 1919; Czechoslovakia, Dec. 22, 1920; Sweden, Dec. 29, 1920; France, Dec. 30, 1920, Patent #534,838, Dec. 30, 1920; Great Britain, Jan. 10, 1921, Patent #157731, Jan 10, 1921; Italy, Jan. 14, 1921), of which the following is a specification.

This invention relates to shock deadening ball or roller bearings especially applicable to bearings for vehicles having the vehicle support excentrically disposed with regard to the hub of the vehicle wheel. In this type of bearing it is usual to provide an excentric interposed between the member supporting the vehicle and the hub member and to provide inner and outer rings of balls between said hub member, said excentric and said supporting member, but in all known constructions the sets of inner and outer rings of balls are positioned in the same plane whereby a large diameter of the hub member results which in many cases necessitates an excessive shortening of the vehicle wheel spokes.

The subject matter of this invention is a ball bearing of this kind in which however, in order to obtain as compact a construction as possible the inner and outer rings of balls situated between the hub member, the excentric and the supporting member are arranged out of line with each other, and their excentric position maintained by ribs and constrictions provided on the excentric and likewise arranged out of line with each other.

In the drawings, Fig. 1 is an axial section through a ball bearing embodying my invention, intended for a front wheel.

Fig. 3 is a section on the line A—B of Fig. 1, and

Fig. 4 is a section on the line C—D of Fig. 2.

The ball bearing consists of the bearing rings $b$, $c$ arranged around the supporting axle of the vehicle and held apart by a distance sleeve $a$. In the hub of the wheel are placed the bearing rings $i$, $j$ separated by a distance sleeve $f$ and serving for the outer rings of balls $g$, $h$. The corresponding rings of balls $e$, $h$ and $d$, $g$, respectively are arranged out of line with each other and receive their excentric positions through a rib $l$ and constrictions $m$ provided on an excentric $k$ situated between the rings of balls, there being a pair of ribs $l$ and constrictions $m$ on the excentric $k$ adjacent each end thereof. A rib $l$ on one side of the axis merges gradually into its cooperating constriction $m$ to form the bearing surface for each set or ring of balls and they are so distributed on the excentric that there is situated alongside the rib $l$ for one ring of balls $d$ or $e$ the constriction $m$ for the other ring of balls $g$ or $h$, or vice versa. By this means there is provided, the excentricity $x$ between the axes I and II of the inner and outer rings of balls remaining constant, a reduction of the diameter of the outer ring of balls, as small a wheel hub as possible and a compact construction of the arrangement.

Figure 1:
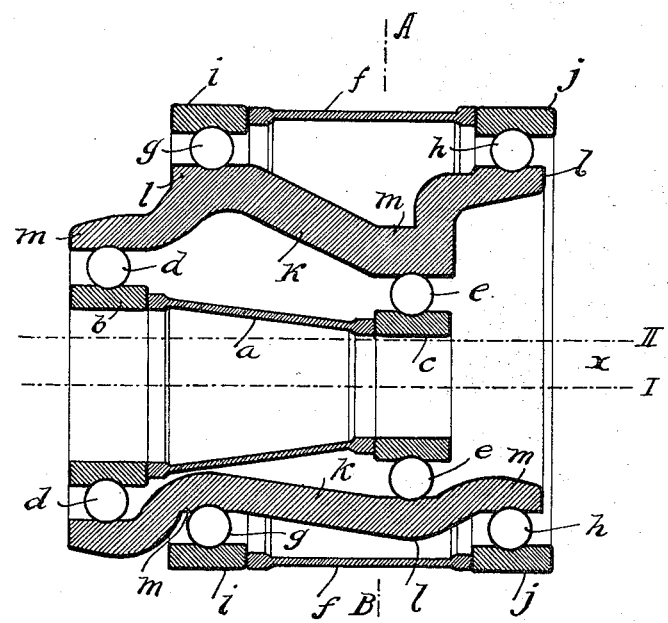
Figure 2:
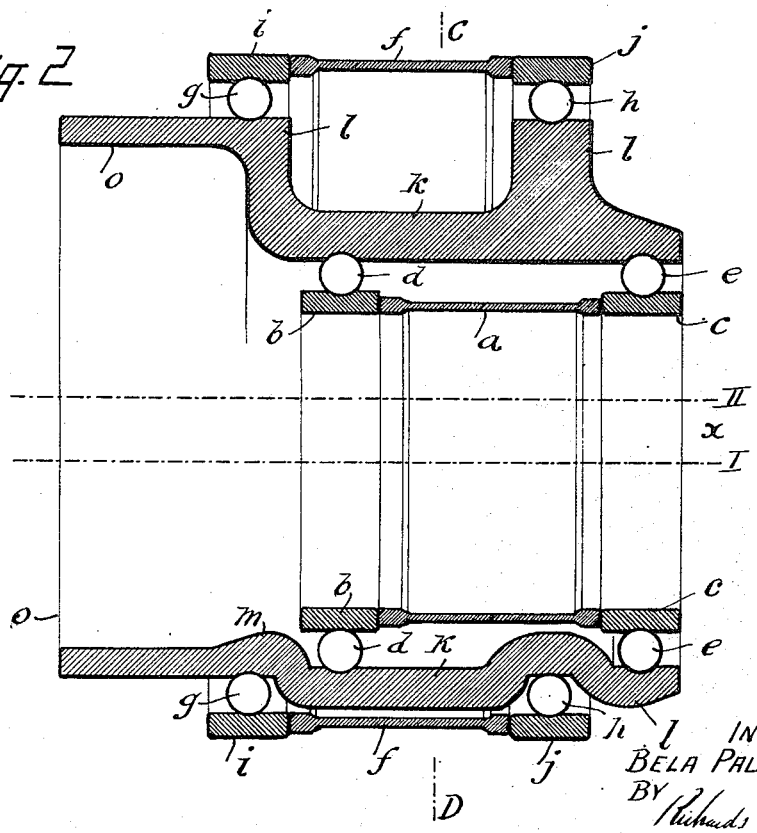
Fig. 2 is an axial section through a bearing for a rear wheel.

In the case of ball bearings intended for the rear wheels (see Figure 2) the excentric $k$ is preferably extended at one end so as to form a means for attaching the brake shoes to the wheel, the construction of this means forming no part of the present mechanism not being shown in the drawing.

What I claim and desire to secure by Letters Patent of the United States is:—

1. A shock deadening ball bearing for vehicles comprising a central sleeve having a plurality of ribs and constrictions formed on its inner and outer surfaces to provide a plurality of inner and outer ball races, eccentrically disposed with respect to the axis of said sleeve, each of said ball races being defined by a rib and a cooperating constriction in alignment therewith, and a ring of balls interposed between said inner races and the axle of the vehicle and a ring of balls interposed between each of the outer races and the wheel hub.

2. A shock deadening ball bearing as set forth in claim 1 in which said ball races are set out of alignment with one another whereby the outer diameter of the bearing is reduced to provide a compact structure.

COMTE BELA PALLAVICINI.